United States Patent
Dimmick, III et al.

(10) Patent No.: US 9,366,151 B2
(45) Date of Patent: Jun. 14, 2016

(54) SYSTEM AND METHOD FOR COVERING A BLADE MOUNTING REGION OF TURBINE BLADES

(75) Inventors: John Herbert Dimmick, III, Greenville, SC (US); Raymond Joseph Lecuyer, Taylors, SC (US); David Arthur Butz, Greenville, SC (US); Norman K. Austin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 13/465,957

(22) Filed: May 7, 2012

(65) Prior Publication Data
US 2013/0294927 A1  Nov. 7, 2013

(51) Int. Cl.
*F01D 5/30*  (2006.01)
*F01D 11/00*  (2006.01)

(52) U.S. Cl.
CPC ............ *F01D 11/006* (2013.01); *F01D 5/3015* (2013.01); *F05D 2230/64* (2013.01); *Y02T 50/671* (2013.01); *Y10T 29/49947* (2015.01)

(58) Field of Classification Search
CPC .................................................. F01D 5/3015
See application file for complete search history.

(56) References Cited

U.S. PATENT DOCUMENTS

| | | | |
|---|---|---|---|
| 2,985,426 A * | 5/1961 | Hunter et al. | 416/97 R |
| 2,998,959 A * | 9/1961 | Haworth | F01D 5/3015 416/193 A |
| 3,501,249 A | 3/1970 | Scalzo et al. | |
| 5,967,745 A | 10/1999 | Tomita et al. | |
| 6,086,329 A | 7/2000 | Tomita et al. | |
| 6,106,188 A | 8/2000 | Krautzig et al. | |
| 6,106,234 A * | 8/2000 | Gabbitas | F01D 5/3015 416/220 R |
| 6,120,249 A | 9/2000 | Hultgren et al. | |
| 6,189,891 B1 | 2/2001 | Tomita et al. | |
| 6,220,814 B1 | 4/2001 | Brushwood et al. | |
| 6,273,683 B1 | 8/2001 | Zagar et al. | |
| 6,315,301 B1 | 11/2001 | Umemura et al. | |
| 6,416,282 B1 | 7/2002 | Beeck et al. | |
| 6,481,967 B2 | 11/2002 | Tomita et al. | |
| 6,561,764 B1 | 5/2003 | Tiemann | |

(Continued)

FOREIGN PATENT DOCUMENTS

| | | |
|---|---|---|
| CN | 1206075 A | 1/1999 |
| EP | 2011969 A1 | 1/2009 |

OTHER PUBLICATIONS

McNeely, Mark, Siemens' H-class Progresses Toward Production, Diesel & Gas Turbine Worldwide, Jan.-Feb. 2006, p. 66.

(Continued)

*Primary Examiner* — Craig Kim
*Assistant Examiner* — Brian O Peters
(74) *Attorney, Agent, or Firm* — Fletcher Yoder, P.C.

(57) ABSTRACT

A system includes a cover segment configured to mount in first and second grooves circumferentially along a blade mounting region of a turbine rotor. The cover segment includes a cover body and at least one fastener. The cover body includes first and second lips extending along first and second circumferential portions of the cover body at an offset from one another. The first lip is configured to mount circumferentially along the first groove and the second lip is configured to mount circumferentially along the second groove. The at least one fastener is configured to retain the cover body to the turbine rotor or at least one blade mounted in the blade mounting region.

18 Claims, 6 Drawing Sheets

(56) References Cited

U.S. PATENT DOCUMENTS

| | | | |
|---|---|---|---|
| 6,884,028 B2 * | 4/2005 | Brauer et al. | 415/173.7 |
| 6,945,749 B2 | 9/2005 | De Cardenas | |
| 7,090,461 B2 | 8/2006 | Liang | |
| 7,264,448 B2 | 9/2007 | Garner | |
| 8,128,371 B2 * | 3/2012 | Ravi et al. | 416/212 R |
| 8,696,320 B2 * | 4/2014 | Harris et al. | 416/248 |
| 2005/0281667 A1 | 12/2005 | Liang | |
| 2007/0014668 A1 | 1/2007 | Engle | |
| 2007/0080505 A1 | 4/2007 | Nereim | |
| 2008/0008584 A1 | 1/2008 | Shteyman et al. | |
| 2008/0196247 A1 | 8/2008 | Ravi et al. | |
| 2010/0047073 A1 | 2/2010 | Bluck et al. | |
| 2010/0196164 A1 | 8/2010 | Liotta et al. | |
| 2010/0215501 A1 | 8/2010 | Amman | |
| 2010/0232938 A1 | 9/2010 | Harris, Jr. et al. | |
| 2013/0272886 A1 * | 10/2013 | Dimmick et al. | 416/220 R |

OTHER PUBLICATIONS

Ratliff, Phil, Paul Garbett, Willibald Fischer, The New Siemens Gas Turbine SGT5-8000H for More Customer Benefit, VGB PowerTech, Sep. 2007, p. 128.

Unofficial English Translation of Chinese Office Action issued in connection with corresponding CN Application No. 201310164132.3 on Jul. 6, 2015.

CN Second Office Action; Application No. CN201310164132.3; Dated Feb. 22, 2016; 10 pages.

* cited by examiner

FIG. 7

SYSTEM AND METHOD FOR COVERING A BLADE MOUNTING REGION OF TURBINE BLADES

BACKGROUND OF THE INVENTION

The subject matter disclosed herein relates to gas turbine engines, and more specifically, to covering a blade mounting region of turbine blades.

In general, gas turbine engines combust a mixture of compressed air and fuel to produce hot combustion gases. The combustion gases may flow through one or more turbine stages to generate power for a load and/or a compressor. Each turbine stage may include multiple blades with cover plates disposed circumferentially around a central rotor. The hot combustion gases may increase temperatures of the blades and central rotor and reduce the fatigue life of the central rotor. The cover plates may reduce the effects of the combustion gases on the blades and central rotor. Some cover plate assemblies require complicated machining. Some cover plates may be shoe-horned into place about the central rotor or customized in the field for installation. Some cover plate assemblies may require removal of multiple cover plates for maintenance and replacement of cover plates or access to specific blades, thereby delaying turbine operation and increasing maintenance costs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine having a turbine rotor, a plurality of blades, and a segmented cover assembly. The turbine rotor includes a blade mounting region with a plurality of blade mounts disposed circumferentially about a rotational axis of the turbine rotor, and first and second grooves extending circumferentially along the blade mounting region at a radial offset from one another relative to the rotational axis. The plurality of blades is disposed in the plurality of blade mounts. The segmented cover assembly includes a plurality of cover segments configured to mount in the first and second grooves circumferentially along the blade mounting region. Each cover segment includes a cover body and at least one fastener. The cover body has first and second lips extending along first and second circumferential portions of the cover body, wherein the first lip is configured to mount circumferentially along the first groove and the second lip is configured to mount circumferentially along the second groove. The at least one fastener is configured to retain the cover body to the turbine rotor or one of the plurality of blades.

In a second embodiment, a system includes a cover segment configured to mount in first and second grooves circumferentially along a blade mounting region of a turbine rotor. The cover segment includes a cover body and at least one fastener. The cover body includes first and second lips extending along first and second circumferential portions of the cover body at an offset from one another. The first lip is configured to mount circumferentially along the first groove and the second lip is configured to mount circumferentially along the second groove. The at least one fastener is configured to retain the cover body to the turbine rotor or at least one blade mounted in the blade mounting region.

In a third embodiment, a method includes mounting a cover body in first and second groove circumferentially along a blade mounting region of a turbine rotor. Mounting includes inserting a first lip of the cover body into the first groove and inserting a second lip of the cover body into the second groove. The first and second lips extend along first and second circumferential portions of the cover body at an offset from one another. Mounting also includes inserting at least one fastener to secure the cover body to the turbine rotor or at least one blade mounted in the blade mounting region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments provide of a segmented cover assembly for a turbine rotor to shield part of the turbine rotor from hot exhaust gases, seal a coolant flow to cool parts of the turbine rotor, damp vibration of the cover assembly, axially retain turbine blades mounted in a plurality of blade mounts, and combinations thereof. The segmented cover assembly may have a plurality of cover segments, each cover segment having a cover body and at least one fastener. The cover segment may be configured to mount along circumferential grooves (e.g., radially offset grooves) of a turbine blade mounting region in an installation position. The circumferential grooves may be oriented in a common direction (e.g., radially inward toward the rotational axis) to permit radial mounting of the cover body. For example, a first lip of the cover body may have a protrusive portion configured to mount into the first groove between the rotor and a first rim, a fastener receptacle may be configured to receive at least one fastener, and a second lip may have a hook portion configured to mount around a second rim and into the second groove. The first groove may retain the cover body axially and radially in a first (e.g., outward) direction during high speed operation. The second groove may retain the cover body axially. The fastener may constrain circumferential rotation of the cover body relative to the turbine rotor and retain the cover body radially in a second (e.g., inward) direction at low speed or idle conditions. The cover segments may be configured to extend over at least one blade mount (e.g., axial blade slot such as dovetail slot) of the turbine rotor. The turbine blade mounts may be axial blade slots, such as dovetail slots that mate with dovetail protrusions of a dovetail joint. The segmented cover assembly of a plurality of cover segments may substantially cover the plurality of blade mounts. The simple method of assembling the segmented cover assembly may be structurally robust, easy to install in the field, and easy to remove in the field.

Figure 1:
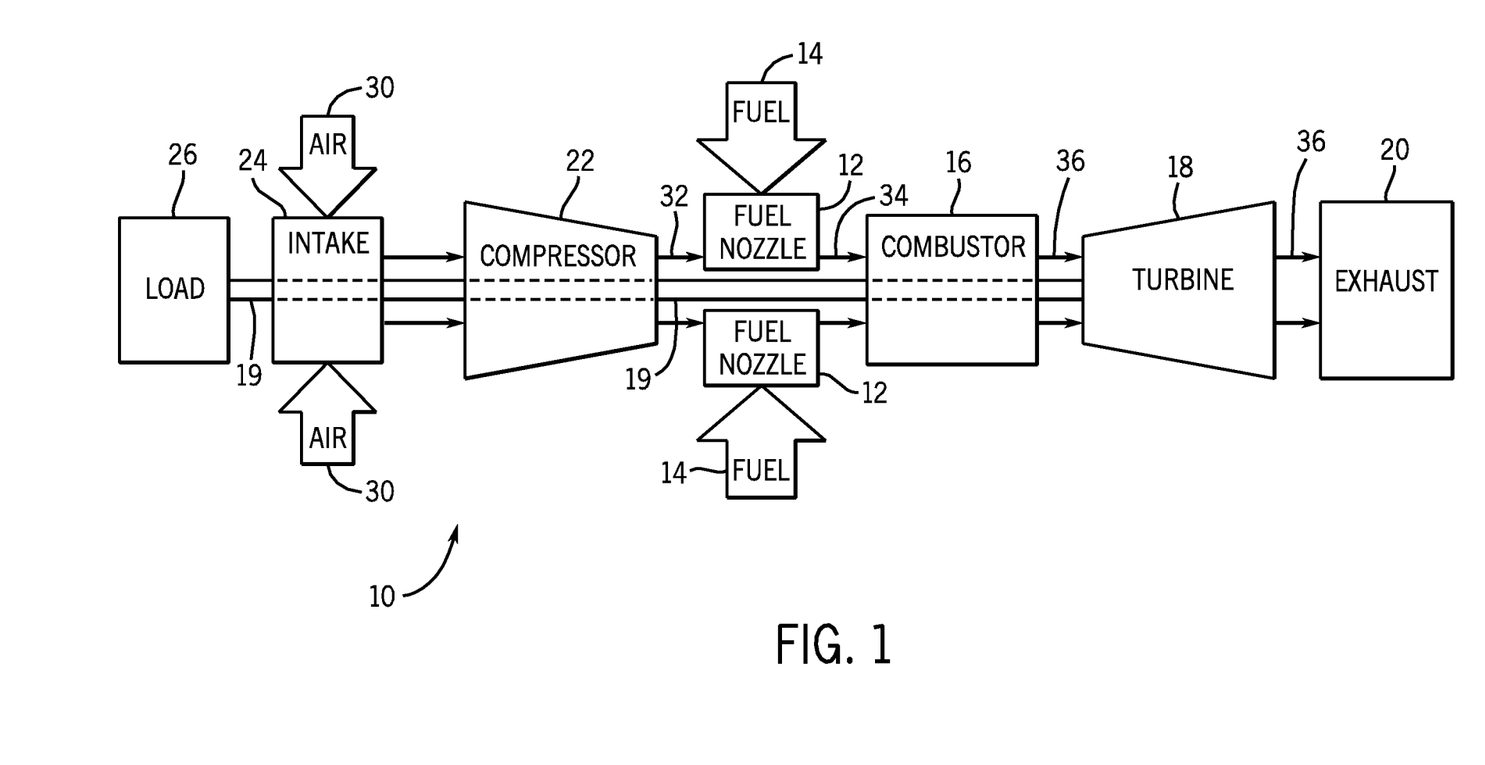
FIG. 1 is a block diagram of an embodiment of a turbine system having a turbine that includes a segmented cover assembly.

Turning now to the drawings and referring first to FIG. 1, a block diagram of an embodiment of a gas turbine system 10 is illustrated. The diagram includes fuel nozzle 12, fuel 14, and combustor 16. As depicted, fuel 14 (e.g., a liquid fuel and/or gas fuel, such as natural gas) is routed to the turbine system 10 through fuel nozzle 12 into combustor 16. The combustor 16 ignites and combusts the air-fuel mixture 34, and then passes hot pressurized exhaust gas 36 into a turbine 18. The exhaust gas 36 passes through turbine blades of a turbine rotor in the turbine 18, thereby driving the turbine 18 to rotate about the shaft 19. In an embodiment, a segmented cover assembly is mounted on the turbine rotor adjacent to the turbine blades to block hot exhaust gas 36 from entering the turbine rotor and/or directly contacting portions of the turbine rotor or shaft 19. As discussed in detail below, embodiments of a turbine system 10 include certain structures and components within turbine 18 that reduce the number of parts for mounting a segmented cover assembly to stages of the turbine 18. In some embodiments, individual cover segments of the cover assembly may be removed from the turbine rotor without disturbing other cover segments. The rotating blades of the turbine 18 cause the rotation of shaft 19, which is coupled to several other components (e.g., compressor 22, load 26) throughout the turbine system 10. Eventually, the exhaust gas 36 of the combustion process may exit the turbine system 10 via exhaust outlet 20.

In an embodiment of turbine system 10, compressor vanes or blades are included as components of compressor 22. Blades within compressor 22 may be coupled to shaft 19 by a compressor rotor, and will rotate as shaft 19 is driven by the turbine 18. Compressor 22 may intake air 30 to turbine system 10 via an air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. The air intake 24 draws air 30 into the turbine system 10 via a suitable mechanism, such as a cold air intake, for subsequent mixture of air 30 with fuel 14 via fuel nozzle 12. Air 30 taken in by turbine system 10 may be fed and compressed into pressurized air 32 by rotating blades within compressor 22. The pressurized air 32 may then be fed into one or more fuel nozzles 12. Fuel nozzles 12 may then mix the pressurized air 32 and fuel 14, to produce a suitable air-fuel mixture 34 for combustion, e.g., a combustion that causes the fuel 14 to more completely burn, so as not to waste fuel 14 or cause excess emissions in the exhaust gas 36. Again, the turbine 18 is driven by the exhaust gases 36, and each stage of the turbine 18 may include the segmented cover assembly described in detail below.

Figure 2:
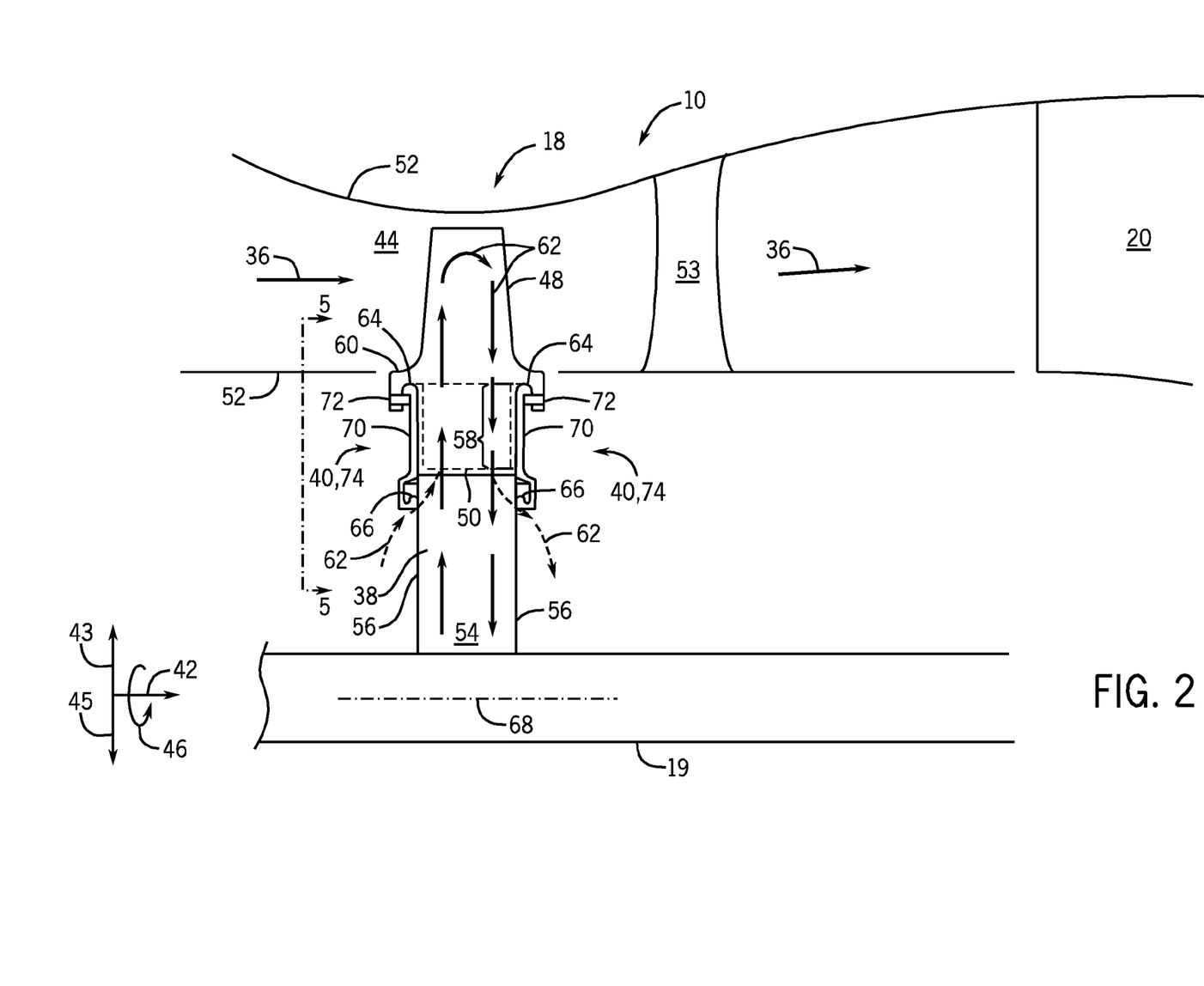
FIG. 2 is a partial cross-sectional view of an embodiment of a turbine including the segmented cover assembly located in a blade mounting region of a turbine rotor.

FIG. 2 presents a cross-sectional view of turbine 18 illustrating a turbine rotor 38 having at least one segmented cover assembly 40. Hot exhaust gas 36 flows into the turbine 18 in an axial direction 42 through a turbine nozzle 44, causing the turbine rotor 38 coupled to the shaft 19 to rotate in a circumferential direction 46. In some embodiments, the turbine 18 may have multiple stages of turbine rotors 38. For example, other turbines 18 may include 1, 2, 3, 4, 5, 6, or more turbine stages. Each turbine stage may include a nozzle 44 and a plurality of turbine blades 48 substantially equally spaced in the circumferential direction 46 about the turbine rotor 38 in a plurality of turbine blade mounts 50. The nozzle body 52 of the turbine 18 may direct exhaust gases 36 towards the turbine blades 48 of one stage into the turbine blades 48 of a subsequent stage, through a stator 53, or into the exhaust outlet 20 after the final stage. As the exhaust gases 36 flow through each turbine stage directed by the nozzle body 52, energy from the exhaust gases 36 is converted into rotational energy of the turbine rotor 38 and shaft 19. After passing through each turbine stage, the exhaust gases 36 exit the turbine 18 in the axial direction 42.

The turbine rotor 38 of each stage includes a rotor body 54 with two rotor faces 56 (e.g., upstream and downstream faces). The plurality of turbine blade mounts 50 may be circumferentially disposed in a blade mounting region 58 at an outer perimeter 60 of the rotor body 54. The blade mounts 50 may be oriented to radially 43 receive turbine blades 48 or axially 42 receive turbine blades 48. Blade mounts 50 may be configured to retain turbine blades 48 during rotation of the turbine rotor 38. In an embodiment, the plurality of turbine blade mounts 50 may include a plurality of axial blade slots (e.g., dovetail slots) extending through at least one rotor face 56. For example, turbine blade mounts 50 may extend through both faces 56 of the rotor body 54 to permit blades to be axially mounted from either face 56. Axial blade slots may substantially restrict any circumferential 46 or radial movement 43 of any axially mounted turbine blade 48 relative to the turbine rotor 38 except movement parallel to the axial direction 42. In some embodiments, a coolant (e.g., cooling air) 62 may circulate around and/or through the turbine rotor 38 and through the plurality of turbine blades 48 as generally indicated by the arrows 62. The cooling air 62 may be from the compressor 22 or from another pressurized air source. Each rotor face 56 (e.g., upstream and downstream faces) may have a first groove 64 and a second groove 66. Both the first 64 and second 66 grooves may extend circumferentially 46 about the rotor 38 along the blade mounting region 58. The blade mounting region 58 may include the blade mounts 50 and part of the rotor face 56 between blade mounts 50. In an embodiment, the first groove 64 may be at a greater radial 43 offset from a rotational axis 68 than the second groove 66, such that the first groove 64 is nearer to the outer perimeter 60. Additionally, in some embodiments, the first groove 64 and second groove 66 may be oriented in a common direction. For example, the first 64 and second 66 grooves may both open radially toward 45 the rotational axis 68 or may both open radially away 43 from the rotational axis 68. The first 64 and second 66 grooves may be configured to permit radial mounting of one or more cover bodies 70 of the segmented cover assembly 40 onto the turbine rotor 38 in either radial direction 43, 45.

In an embodiment, a segmented cover assembly 40 may be mounted in the first 64 and second 66 grooves of the blade mounting region 58 along one or both faces 56 to axially 42 retain the plurality of turbine blades 48 in the plurality of blade mounts 50, to seal cooling air 62 in the blade mounting region 58, to damp vibration, and/or to shield the blade mounting region 58 from hot exhaust gases 36 that otherwise contact the turbine rotor 38. The segmented cover assembly 40 may include a plurality of cover segments 74 configured to mount in the first 64 and second 66 grooves circumferentially 46 along the blade mounting region 58. For example, the segmented cover assembly 40 may include 2 to 100 (e.g., (2, 3, 4, 5, 6, 7, 8, 9, 10, or more) cover segments 74. Each cover segment 74 may include a cover body 70 and at least one fastener 72. In an embodiment, each cover body 70 may be configured to mount in the first 64 and second 66 grooves circumferentially 46 along the blade mounting region 58 of the upstream and/or downstream faces 56. Fasteners 72 may be configured to retain the cover body 70 in the circumferential direction 46 and opposite radial directions 43 and 45. Each cover body 70 may be retained by 1, 2, 3, 4, 5, 6, 7, 8, 9, 10, or more fasteners 72. In some embodiments, each cover segment 74 of the segmented cover assembly 40 may include the same or different numbers of fasteners 72 as other cover segments 74. For example, each cover segment 74 may include 1, 3, or 5 fasteners 72. Less fasteners 72 may provide for ready replacement of fasteners 72 and/or cover bodies 70 and lower susceptibility of fasteners 72 falling into the turbine 18. Fasteners 72 may also be configured to retain the cover body 70 in a first 43 and/or second 45 radial direction. Fasteners 72 may retain the cover body 70 to the turbine rotor 38 and/or one of the plurality of blades 48. In an embodiment, the segmented cover assembly 40 may substantially cover the plurality of blade mounts 50. Each cover segment 74 may cover one or more blade mounts 50. In some embodiments, the cover segments 74 may be mounted to abut adjacently mounted cover segments 74.

Figure 3:
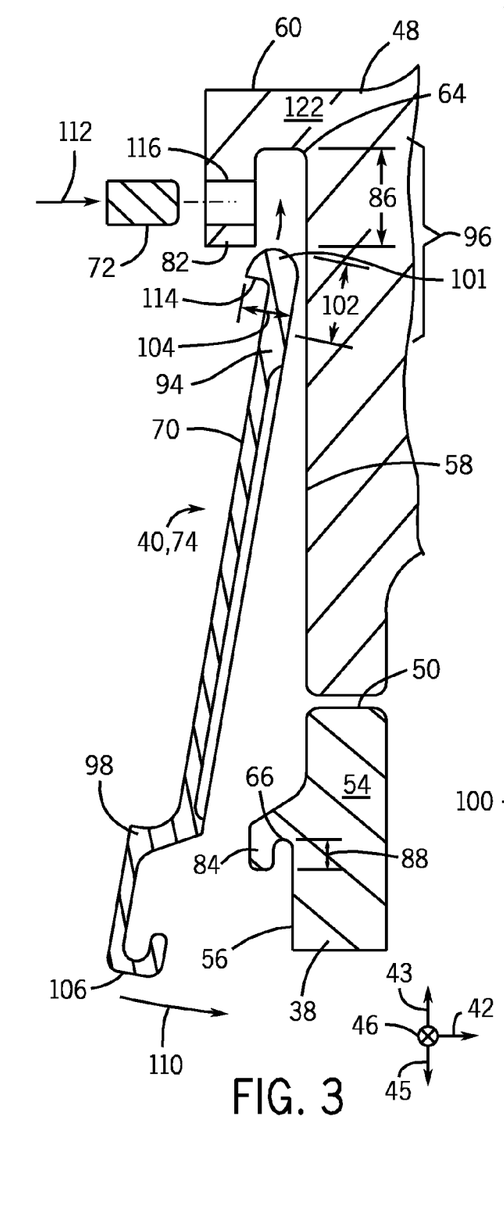
FIG. 3 is a partial cross-sectional view of an embodiment of a turbine, illustrating mounting of a cover segment including a cover body and fastener to a turbine rotor.

FIG. 3 illustrates an embodiment of mounting a cover segment 74 along the blade mounting region 58 of a turbine rotor 38. In an embodiment, the cover body 70 may be installed in a substantially radial direction 43 into the first 64 and second grooves 66 of the turbine rotor 38. The first groove 64 may be axially 42 disposed between the turbine rotor 38 and a first rim 82, and the second groove 66 may be axially 42 disposed between the turbine rotor 38 and a second rim 84. As discussed above, the first groove 64 and second groove 66 may be oriented in a common direction to enable mounting of the cover body 70 in the common direction. As illustrated, the first 64 and second 66 grooves are oriented to open in the second radial direction 45 inwardly toward the rotational axis 68. One or more fasteners 72 may be inserted through the first rim 82 to interface with the cover body 70. This configuration may provide radial retention in the first and second radial directions 43, 45 for the cover body 70 within the first 64 and second 66 grooves during rotation and non-rotation of the turbine rotor 38. In some embodiments, the first 64 and second 66 grooves may be oriented to open toward the outer perimeter 60 in the first radial direction 43. Alternatively, the first 64 and second 66 grooves may be oriented to open toward or away from each other. In some embodiments, the first groove 64 may extend through one or more blades 48 mounted in the turbine rotor 38. The first rim 82 may define a first groove depth 86 and the second rim 84 may define a second groove depth 88.

The cover body 70 may be configured to be radially 43 mounted in the first 64 and second 66 grooves of the turbine rotor 38. In an embodiment, a first lip 94 may extend along a first circumferential portion 96 of the cover body 70, and a second lip 98 may extend along a second circumferential portion 100 of the cover body 70 opposite the first circumferential portion 96. The first lip 94 may be configured to mount circumferentially 46 along the first groove 64, and the second lip 98 may be configured to mount circumferentially 46 along the second groove 66. The first 64 and second 66 grooves axially retain the cover body 70 and also retain the cover body 70 in at least one radial direction 43 and/or 45. Again, during rotation of the rotor 38, the centrifugal force biases the cover body 70 in the radial direction 43, thereby helping to retain the cover body 70 during operation.

The first 94 and second 98 lips may have a variety of shapes configured to mount with various orientations, shapes, and depths of the respective first 64 and second 66 grooves. For example, in some embodiments as shown in FIG. 3, the first lip 94 may have a protrusive portion 101 with substantially the same depth 102 as the first groove depth 86 and substantially the same width 104 as the first groove 64. In an embodiment, the first lip 94 may be wedged or force fit into the first groove 64 between the first rim 82 and the rotor face 56. The second lip 98 may have a hook portion 106 (e.g., a J-shaped or U-shaped hook portion) configured to extend around the second rim 84 and into the second groove 66 between the second rim 84 and the rotor face 56 when mounted. The hook portion 106 may have a drop down space 108 (e.g., axial recess or slot) configured to permit radial 43 installation of the cover body 70 into the first 64 and second 66 grooves and accommodate the second rim 84. In some embodiments, the first lip 94 may be inserted into the first groove 64 and the second lip 98 may be inserted (e.g., hooked into) the second groove 66. In other embodiments, the cover body 70 may be installed in an opposing second radial direction 45, such that the second lip 98 is configured to mount in the second groove 66 with a protrusive portion 100 and the first lip 94 is configured to mount in the first groove 64 with a hook portion 106. In another embodiment, both the first lip 94 and the second lip 98 may have a hook portion 106 to extend around the first 82 and second 84 rims. Various embodiments of the first 94 and second 98 lips are not limited to the embodiments shown and may be configured to be mounted in the first 64 and second 66 grooves by any combination of protrusive portions 100 and hook portions 106. In some embodiments, other shapes or configurations of the first 94 and second 98 lips with the first 64 and 66 grooves may permit radial mounting of the cover body 70 in either the first 43 or second 45 radial direction.

In an embodiment, the first lip 94 of the cover body 70 may be inserted into the first groove 64 in a first substantially radial direction 43. As the first lip 94 begins to enter the first groove 64, the cover body 70 may pivot or rotate about the first lip 94 toward the turbine rotor 38 as indicated by the arrow 110, so that the second lip 98 may be inserted into the second groove 66. One or more fastener receptacles 114 of the cover body 70 may be configured to receive at least one fastener 72 inserted in the axial direction 42 as indicated by the arrow 112. Fastener receptacles 114 in the cover body 70 may be disposed in the first lip 94, second lip 98, or combinations thereof. One or more fasteners 72 may retain each cover body 70 through fastener receptacles 116 in the turbine blade 48 or rotor body 54. The number of fasteners 72 and fastener receptacles 114 for each cover segment 74 may include 1, 2, 3, 4, 5, 6, 7, 8, 9, 10, or more. In an embodiment, a cover segment 74 may have fewer fasteners 72 than fastener receptacles 114. This may ease installation of the cover segment 74. The at least one fastener 72 (e.g., a single fastener per segment 74) may be configured to substantially prevent movement of the cover body 70 in the second radial direction 45. The at least one fastener 72 may also block movement of the cover body 70 along the first 64 and second 66 grooves in the circumferential directions 46. The fasteners 72 may include, but are not limited to pins, bolts, tabs, and combinations thereof. In some embodiments, the fasteners 72 may be configured to be axially 42 retained by mechanical means such as staking, self-locking threaded connections, clips, or combinations thereof.

Figure 4:
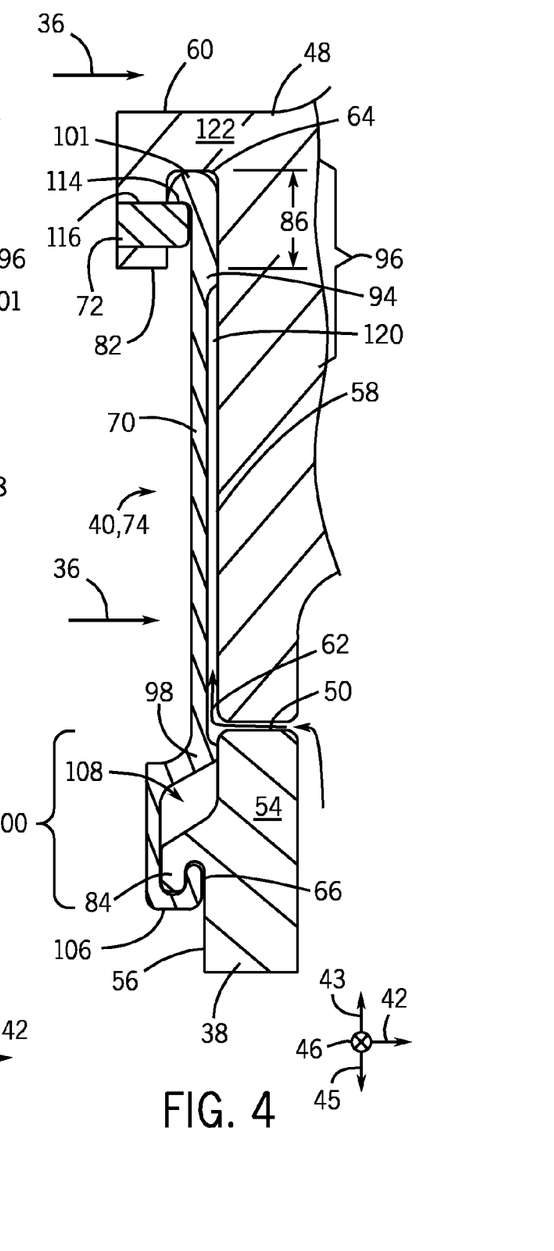
FIG. 4 is a cross-sectional view of an embodiment of a cover segment mounted on a turbine rotor.

FIG. 4 illustrates a cover body 70 mounted in the first 64 and second 66 grooves with an inserted fastener 72 to retain the cover body 70 to the turbine rotor 38. The first 94 and second 98 lips may define a sealed portion 120 with the blade mounting region 58 and the turbine blade 48 mounted in the blade mount 50. The cover body 70 may seal the sealed portion 120 from the exhaust gases 36 and retain coolant 62 that may flow between the turbine rotor 38 and the turbine blade 48 at the blade mount 50. The at least one fastener 72 be removably inserted through a turbine blade base 122 (as shown) or the rotor body 54 through a fastener receptacle 116. The at least one fastener receptacle 114 of the cover body 70 may include, but is not limited to, an axial 42 hole substantially complementary to the at least one fastener 72, a recess, or a rim. The fastener 72 and first 64 and/or second 66 grooves may substantially block movement of the cover body 70 in both the first radial direction 43 and the second radial direction 45. In some embodiments, the at least one fastener 72 may also substantially block any circumferential 46 movement of the cover body 70 relative to the rotor body 54 due to a interference of the at least one fastener 72 on the at least one fastener receptacle 114 or the at least one fastener 72 passing through at least part of the cover body 70. In an embodiment, a cover body 70 may be retained in the first 43 and second 45 radial directions by at least one fastener 72, first groove 64, and second groove 66, retained in the axial direction 42 by the first rim 82, second rim 84, rotor face 56, and one or more turbine blades 48, and retained in the circumferential direction 46 by at least one fastener 72 and/or other cover bodies 70 of the segmented cover assembly 40 that abut the cover body 70. Again, the centrifugal force of the rotor 38 during rotation helps to bias the cover body 70 in the radial direction 43 into the first 64 and second 66 grooves to provide retention during operation.

Figure 5:
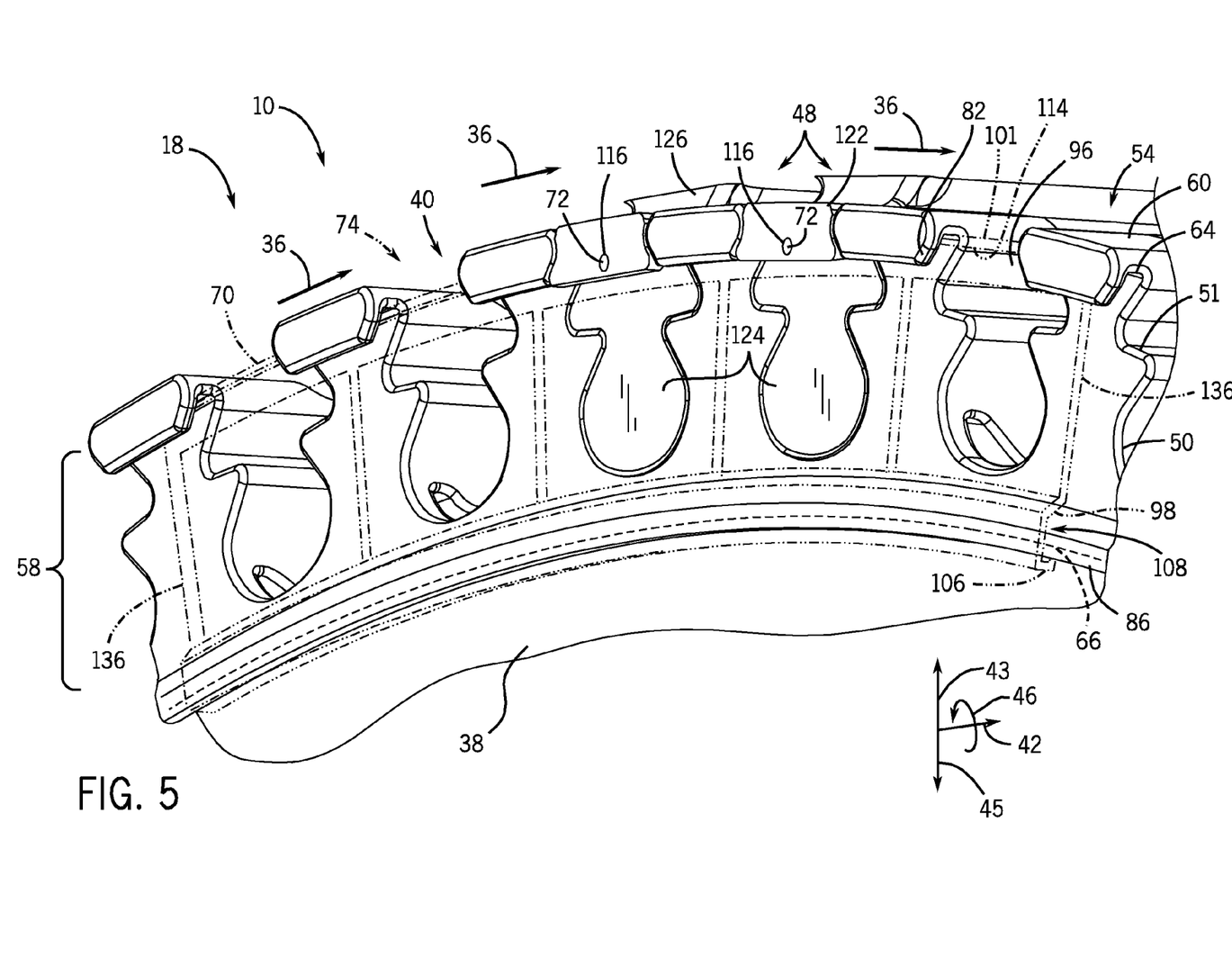
FIG. 5 is a perspective view of an embodiment of a turbine rotor of FIG. 2 within lines 5-5, wherein the turbine rotor has a mounted cover body.

As discussed above, blade mounts 50 may extend axially 42 through the turbine rotor body 54, and may include axial blade slots 50 as shown in FIG. 5. FIG. 5 illustrates a cover body 70 (dashed lines) mounted in first 64 and second 66 grooves of the turbine rotor 38. In some embodiments, blade mounts 50 may be machined from a turbine rotor body 54 or forged with the turbine rotor body 54. In some embodiments, the first 64 and second 66 grooves may be formed with the blade mounts 50. Blade mounts 50 may be configured to radially 43 retain turbine blades 48. Turbine blades 48 mounted in blade mounts 50 may have a blade base 122, a blade root 124, and a blade body 126. The blade roots 124 (e.g., dovetail protrusions of dovetail joints) may have a complementary shape (e.g., dovetail shape) to the blade mounts 50 (e.g., dovetail slots of dovetail joints), so that the turbine blades 48 may be radially 43 secured during rotation of the turbine rotor 38 in the circumferential direction 46. For example, the connections between blade roots 124 and blade mounts 50 may include, but are not limited to, threaded, pinned, and dovetailed connections. In an embodiment, blade mounts 50 are axial blade slots with a dovetail shape 51. The blade base 122 may extend beyond the blade mount 50 of the turbine rotor 38 in the axial direction 42 and circumferential direction 46 along the outer perimeter 60. In some embodiments, extensions of the blade base 122 in the circumferential direction 46 may shield the outer perimeter 60 from high temperature exhaust gases 36. As discussed above, in some embodiments, the first groove 64 may extend through axial extensions of the blade base 122, and the first rim 82 may include at least part of the blade base 122. In this embodiment, the turbine rotor body 38 and/or turbine blade 48 may radially retain the cover body 70, while the cover segment 74 axially retains the turbine blade 48 in opposite axial directions 42.

While only one segment of the turbine rotor 38 is shown, it should be appreciated that the turbine rotor 38 is annular and extends about the entire circumference of turbine 18. Furthermore, while one cover segment 74 is shown, embodiments may include multiple cover segments 74 that abut each other around the circumferential 46 extent of the turbine rotor 38. For example, certain embodiments may include 2, 3, 4, 5, 10, 15, 20, 25, 30, or more cover segments 74 that collectively extend 360 degrees about the turbine rotor 38. The at least one fastener 72 of each cover segment 74 may be removed to permit the respective cover body 70 to be removed in a second 45 radial direction. In this manner, each cover segment 74 may be removed from the blade mounting region 58 separately without affecting (e.g., removing) the other cover segments 74 of the segmented cover assembly 40. In other embodiments, the cover body 70 may be removed in a first radial direction 43. In some embodiments, each fastener 72 may include a ferromagnetic or paramagnetic material to aid in retrieval should a fastener 72 accidentally fall into a turbine 18 during maintenance. A ferromagnetic or paramagnetic fastener material may aid in retention of the cover body 70 in the blade mounting region 58.

As illustrated, the cover body 70 extends in circumferential direction 46 to substantially cover five blade mounts 50. Other embodiments may employ cover bodies 70 that substantially extend over 1, 2, 3, 4, 5, 6, 7, 8, 9, 10, or more blade mounts 50. In some embodiments, the cover body 70 may have at least one fastener receptacle 114 and fastener 72 for each blade mount 50 covered. For example, FIG. 5 illustrates a fastener 72 inserted through each blade base 122 of turbine blades 48 mounted in blade mounts 50. In other embodiments, each cover body 70 may be fastened to the turbine rotor 38 and/or blade base 122 near the circumferential ends 136 of the cover body 70. It may be desirable to minimize the number of fasteners 72 per cover segment 74, for example to reduce weight, to simplify installation and removal, and to decrease the susceptibility of fasteners 72 falling into the turbine 18. Furthermore, in some embodiments, each circumferential end 136 of the cover body 70 is offset circumferentially 46 from circumferential ends 138 of turbine blade bases 122. In this configuration, the interface between cover segments 74 does not coincide with the interface between turbine blade bases 122. This arrangement may facilitate increased thermal protection for the turbine rotor 38, because the turbine blade bases 122 and cover segments 74 may substantially seal parts (e.g., rotor face 56 and perimeter 60) of the turbine rotor 38 from hot exhaust gases 36.

Figure 6:
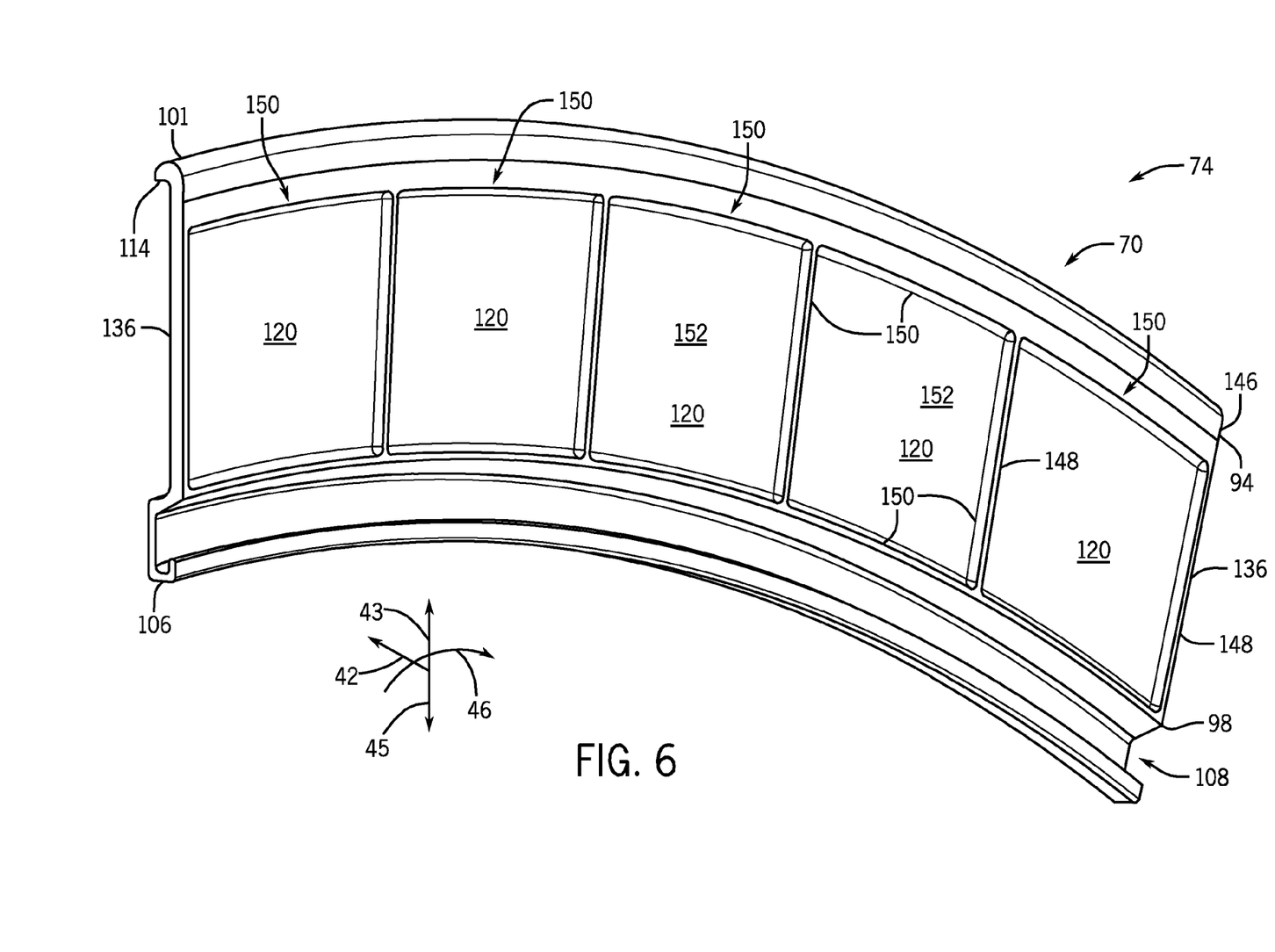
FIG. 6 is a rear view of an embodiment of a rear face of a cover body.

FIG. 6 illustrates a rear view of the cover body 70. In an embodiment, a rear face 146 of the cover body 70 may have multiple ribs 148 extending radially between the first lip 94 and second lip 98. Furthermore, the rear face 146 may have a rib 148 at each circumferential end 136. The ribs 148 may provide structural support and stiffness. The ribs 148 may also affect the resonant frequency of the cover body 70. The first 94 and second 98 lips with the ribs 148 may form a sealing rib 150 (e.g., hollow rectangular frame or rib) configured to substantially extend around a recess 152 of the cover body 70, thereby helping to define the seated portion 120. Each cover body 70 may have at least one recess 152 on the rear face 146.

Figure 7:
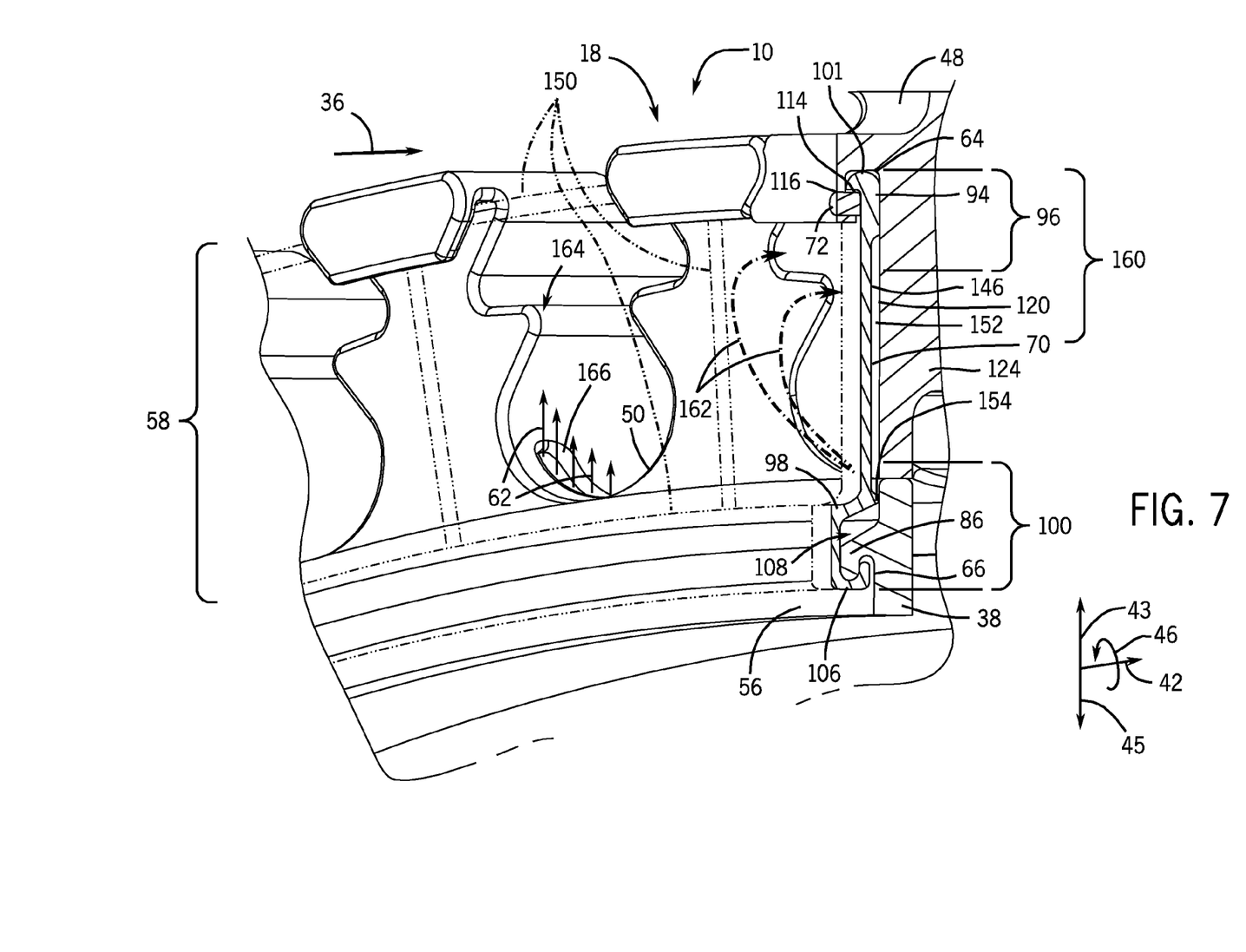
FIG. 7 is a front perspective view of an embodiment of a cover segment directing coolant flow through a blade mounting region of a turbine rotor, wherein the cover body is shown in dashed lines.

FIG. 7 illustrates a perspective view and partial cross-section of a cover body 70 mounted along the blade mounting region 58 of a turbine rotor 38. The rear face 146 may be adjacent to the rotor face 56 and turbine blades 48 of the turbine rotor 38 when the cover body 70 is mounted along the first 64 and second 66 grooves. In some embodiments, the ribs 148 may be configured to contact the turbine rotor 38 and/or turbine blade root 124. For example, the ribs 148 may extend radially 43 between the first 94 and second 98 lips along the turbine rotor 38 between blade mounts 50. The first 94 and second 98 lips may also be configured to contact the rotor face 56 and turbine blades 48. In some embodiments, each recess 152 on the rear face 146 substantially opposes and covers a blade root 124 (e.g., dovetail protrusion) mounted in a blade mount 50 (e.g., dovetail slot). In some embodiments, a sealing rib 150 (e.g., e.g., defined by ribs 148, lip 94, and lip 96) may extend around the first 96 and second 100 circumferential portions of the cover body 70, and each recess 152 may be configured to cover multiple blade mount 50 to define the sealed portion 120.

In an embodiment, part of the second lip 98 may be configured to form the lower portion 154 of the sealing rib 150, and another part of the second lip 98 may form the hook portion 106 configured to extend around the second rim 84. The second lip 98 may seal the recess 152 from exhaust gases 36 by contact between the lower portion 154 and the turbine rotor 38, by contact between the hook portion 106 and the turbine rotor 38, or combinations thereof. Contact between the sealing rib 150 and rotor face 56 or blade root 124 may enclose the recess 152 to form the sealed portion 120.

The sealing rib 150 may be configured to direct a coolant 62 (e.g., a compressed cooling air) through the sealed portion 120 along blade mounting region 58. Coolant 62 may flow through the rotor body 54 and into the turbine blades 48 via coolant passages 166 in the blade mounts 50. In some embodiments, coolant 62 may exit the coolant passages 166 and pass between the blade slot 50 and blade root 124 into the sealed portion 120. The sealing rib 150 around the recess 152 may retain the coolant 62 in the sealed portion 120 to block the coolant 62 from escaping the blade mounting region 58. In some embodiments, the sealing rib 150 may direct the coolant 62 toward the upper portion 160 of the blade root 124 as indicated by arrows 162. Some portions of the blade slot 50 and blade root 124, particularly corners 164, may experience high stresses and loads during rotation of the turbine rotor 38. Coolant 62 in the sealed portion 120 may cool high temperature and/or high stress regions (e.g., corners 164) to extend the useful life of the turbine blade 48 and/or blade mount 50. In an embodiment with recesses 152 covering more than one blade mount 50, coolant 62 from one blade mount 50 may be directed to cool the turbine blade 48 of another blade mount 50.

During rotation of the turbine rotor 38, the cover body 70 may deflect as it is loaded (e.g., compressed) in the radial direction 43. In some embodiments, the cover body 70 may be configured to deflect under the centrifugal load and cause at least part of the rear face 146 (e.g., rib 148) to contact the turbine rotor 38. This additional contact from deflection may further seal the sealed portion 120 to direct coolant 62 about the turbine blade root 124. In some embodiments, deflection of the cover body 70 may also affect the resonant frequency of the cover body 70 to increase stability of the turbine rotor 38 and segmented cover assembly 40 during operation. In some embodiments, the at least one fastener 72 may force part of the cover body 70 onto the turbine rotor 38 and affect the resonant frequency of the cover body 70 to decrease vibrations. Additionally, the fastener receptacle 114 of some embodiments may extend through to the rear face 146 and contact the rotor body 38 (e.g., rotor face 56) in the blade mounting region 58. Such fastener receptacles 114 may be through the first lip 94 or the second lip 98. In some embodiments, the fasteners 72 and fastener receptacles 114 of the segmented cover assembly 40 may be configured to substantially maintain the rotational stability of the turbine rotor 38 by affecting the balance of the turbine rotor 38. For example, fasteners 72 may be installed in a rotationally symmetric manner about the turbine rotor 38 to distribute the mass of the fasteners 72 symmetrically about the turbine rotor 38.

The disclosed embodiments provide a method of installing a segmented cover assembly 40 in a turbine rotor 38 to retain turbine blades 48, shield the turbine rotor 38 from exhaust gases 36, damp vibration, and/or seal cooling air 62 in the sealed portion 120. For example, turbine blades 48 may be inserted into blade mounts 50 of the rotor body 54 (e.g., in an axial direction 42). The first lip 94 of a cover body 70 may be inserted into a first circumferential groove 64 of the blade mounting region 58, and the second lip 98 of the cover body 70 may be inserted into a second circumferential groove 66 of the blade mounting region 58. The first 94 and second 98 lips may be at an offset from one another. In some embodiments, the first 94 and second 98 lips are inserted into the first 64 and second 66 grooves in a first radial direction 43. In an embodiment, the first lip 94 may have a protrusive portion 101 with a fastener receptacle 114 to be inserted into the first groove 64, and the second lip 98 may have a hook portion 106 that hooks into the second groove 66 around part of the turbine rotor 38. At least one fastener 72 may then be inserted into the turbine rotor 38 or a turbine blade 48 to secure the cover body 70 in the blade mounting region 58. In this way, a plurality of cover bodies 70 and fasteners 72 may be mounted in the blade mounting region 58 of a turbine rotor 38, forming a segmented cover assembly 40 that substantially covers a plurality of blade mounts 50 spaced about the turbine rotor 38. In some embodiments, the cover body 70 may be mounted along the blade mounting region 58 differently than described above. For example, the first lip 94 may have a hook portion 106 and the second lip 98 may have a protrusive portion 101. In another embodiment, the first 64 and second 66 grooves may radially oppose one another. In an embodiment, the first 94 and second 98 lips may have a hook portion 106.

Technical effects of the invention include a segmented cover assembly 40 with a plurality of cover segments 74. Each cover segment 74 has a cover body 70 and at least one fastener 72. The cover body 74 may be configured to be radially inserted in a first radial direction 43 into first 64 and second grooves 66. The at least one fastener 72 may be configured to be inserted in an axial direction 42 to substantially block movement of the cover body 70 in a second radial direction 45 and a circumferential direction 46. When mounted, the cover segment 74 may retain turbine blades 48, shield the turbine rotor 38 from exhaust gases 36, damp vibration, and/or seal coolant 62 in sealed portion 120 covering at least one blade mount 50. Multiple cover segments 74 may form a cover assembly 40 with a minimal number of parts, where each cover segment 74 may be removed separately in a radial direction 45 without disassembling or disturbing other cover segments 74. Additionally, the segmented cover assembly 40 may be mounted without substantially negatively affecting the stability of the turbine rotor 38 due to vibration and/or imbalance of the turbine rotor 38. Again, during rotation of the rotor 38, the centrifugal force biases the cover body 70 in the radial direction 43, thereby helping to retain the cover body 70 via the first 64 and second 66 grooves during operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a turbine, comprising:
      a turbine rotor comprising a blade mounting region having a plurality blade mounts disposed circumferentially about a rotational axis of the turbine rotor, and first and second grooves extending circumferentially along the blade mounting region at a radial offset from one another relative to the rotational axis;
      a plurality of blades disposed in the plurality of blade mounts, wherein the plurality of blade mounts comprises a plurality of blade slots;
      a segmented cover assembly comprising a plurality of cover segments configured to mount in the first and second grooves circumferentially along the blade mounting region, wherein each cover segment comprises:
         a cover body comprising:
            a sealing rib configured to interface with the blade mounting region and to extend around at least one axial blade slot of the plurality of blade slots when the cover body is in a mounted position;
            a first lip extending along a first circumferential portion of the cover body, wherein the first lip is configured to mount circumferentially along the first groove when the cover body is in the mounted position; and
            a second lip extending along a second circumferential portion of the cover body, wherein the second lip is disposed radially opposite the first lip, and the second lip is configured to mount circumferentially along the second groove when the cover body is in the mounted position, wherein the second lip comprises a hook portion, and a drop down space is formed between the hook portion, the sealing rib, and the turbine rotor when the cover body is in the mounted position; and
         at least one fastener configured to retain the cover body to the turbine rotor or one of the plurality of blades.

2. The system of claim 1, wherein each cover segment is configured to mount the first and second lips in a first radial direction into the first and second grooves, and the at least one fastener is configured to block movement of the cover segment in a second radial direction opposite to the first radial direction.

3. The system of claim 1, wherein the first lip comprises a protrusive portion having a fastener receptacle configured to receive the at least one fastener.

4. The system of claim 1, wherein the segmented cover assembly substantially covers the plurality of axial blade slots.

5. The system of claim 1, wherein the sealing rib is configured to direct a coolant flow through the blade mounting region.

6. The system of claim 1, wherein each cover segment is configured to extend over at least first and second blade mounts of the plurality of blade mounts.

7. The system of claim 1, wherein the turbine comprises a gas turbine.

8. The system of claim 1, wherein the first and second grooves are oriented in a common direction.

9. The system of claim 8, wherein the first and second grooves are oriented in the common direction radially inward toward the rotational axis.

10. A system, comprising:
    a cover segment configured to mount in first and second grooves circumferentially along a blade mounting region of a turbine rotor, wherein the first groove is radially outside the second groove, and the cover segment comprises:
       a cover body comprising:
          a sealing rib comprising a lower portion configured to interface with the turbine rotor radially between an axial blade slot and the second groove when the cover body is in a mounted position, wherein the sealing rib is configured to interface with the blade mounting region to form a sealed portion axially between the cover body and the axial blade slot, and the sealing rib is configured to extend around at least one axial blade slot in the blade mounting region;
          a first lip extending along a first circumferential portion of the cover body, wherein the first lip is configured to mount circumferentially along the first groove when the cover body is in the mounted position; and
          a second lip extending along a second circumferential portion of the cover body, wherein the second lip is configured to mount circumferentially along the second groove when the cover body is in the mounted position, wherein the second lip comprises a hook portion, and a drop down space is formed between the hook portion, the lower portion of the sealing rib, and the turbine rotor when the cover body is in the mounted position; and
       at least one fastener configured to retain the cover body to the turbine rotor or at least one blade mounted in the blade mounting region.

11. The system of claim 10, wherein the first and second lips are oriented in a common radial direction, and the at least one fastener is oriented in an axial direction.

12. The system of claim 10, wherein the cover segment is configured to mount the first and second lips in a first radial direction into the first and second grooves, and the at least one fastener is configured to block movement of the cover segment in a circumferential direction and a second radial direction opposite to the first radial direction.

13. The system of claim 10, wherein the first lip comprises a protrusive portion having a fastener receptacle configured to receive the at least one fastener.

14. The system of claim 10, wherein the sealing rib is configured to direct a coolant flow through the sealed portion.

15. The system of claim 12, comprising a turbine having the turbine rotor and the cover segment.

16. A method, comprising:
mounting a segmented cover body in first and second grooves circumferentially along a blade mounting region of a turbine rotor, wherein the first groove is radially outside the second groove, and mounting comprises:
inserting a first lip of a cover body segment into the first groove;
inserting a second lip of the cover body segment into the second groove after inserting the first lip of the cover body into the first groove, wherein the first and second lips extend along first and second circumferential portions of the cover body segment at an offset from one another, the second lip comprises a hook portion, and the cover body segment is in a mounted position when the first lip interfaces with the first groove and the second lip interfaces with the second groove;
interfacing a sealing rib with the turbine rotor to form a sealed portion and a drop down space when the cover body segment is in the mounted position, wherein the sealed portion is disposed between the cover body segment and the blade mounting region, the sealing rib extends around and interfaces with an axial blade slot in the blade mounting region when the cover body segment is in the mounted position, and the drop down space is disposed between the hook portion, the sealing rib and the turbine rotor when the cover body segment is in the mounted position; and
inserting, after inserting the second lip of the cover body segment into the second groove, at least one fastener to secure the cover body segment to the turbine rotor or at least one blade mounted in the blade mounting region; and
directing a coolant flow through the sealed portion.

17. The method of claim 16, wherein inserting the first and second lips comprises inserting the first and second lips in a first radial direction into the first and second grooves, and inserting the at least one fastener comprises inserting the at least one fastener in an axial direction to block movement of the cover body segment in a second radial direction opposite to the first radial direction.

18. The method of claim 16, wherein inserting the first lip comprises inserting a protrusive portion having a fastener receptacle configured to receive the at least one fastener, and inserting the second lip comprises hooking the second groove with the hook portion.

* * * * *